United States Patent [19]

Schora et al.

[11] 4,023,280

[45] May 17, 1977

[54] VALVE FOR ASH AGGLOMERATION DEVICE

[75] Inventors: Frank C. Schora, Palatine; John W. Loeding, Naperville; Jitendra G. Patel, Bollingbrook, all of Ill.

[73] Assignee: Institute of Gas Technology, Chicago, Ill.

[22] Filed: May 12, 1976

[21] Appl. No.: 685,617

[52] U.S. Cl. .................................... 34/10; 302/59; 432/15; 23/284; 34/57 A; 48/77; 48/83; 48/63; 48/197 R; 110/28 J; 110/165 R; 202/262; 251/212

[51] Int. Cl.² ..................... F26B 3/08; F26B 3/08

[58] Field of Search .......... 48/77, 73, 63, 83, 86 R, 48/202, 206, 210, 212, 197 R; 23/284; 201/31; 202/262; 110/8 F, 28 J, 165 R; 432/15, 28; 251/212; 34/10, 57 A; 302/59; 222/195

[56] References Cited

UNITED STATES PATENTS

| | | | |
|---|---|---|---|
| 2,906,608 | 9/1959 | Jequier et al. | 23/284 |
| 3,159,179 | 12/1964 | DeLain | 251/212 |
| 3,216,125 | 11/1965 | Dennert | 34/57 A |
| 3,867,114 | 2/1975 | Doig | 34/57 A |
| 3,945,809 | 3/1976 | Donath | 48/73 |

*Primary Examiner*—Robert L. Lindsay, Jr.
*Assistant Examiner*—George C. Yeung
*Attorney, Agent, or Firm*—Allegretti, Newitt, Witcoff & McAndrews

[57] ABSTRACT

A fluidized bed of material retained in a vessel receives a high velocity gas stream through a venturi orifice and passage to assist in the agglomeration of ash particles. The particles form a semi-fixed bed within the passage upstream from the venturi orifice. The particular dimensions of the semi-fixed bed are dependent, in part, upon the orifice size of the venturi. An iris valve defining the orifice permits adjustment of the cross-sectional area of the orifice thereby controls the velocity of the gas stream through the venturi.

7 ~ ns, 6 Drawing Figures

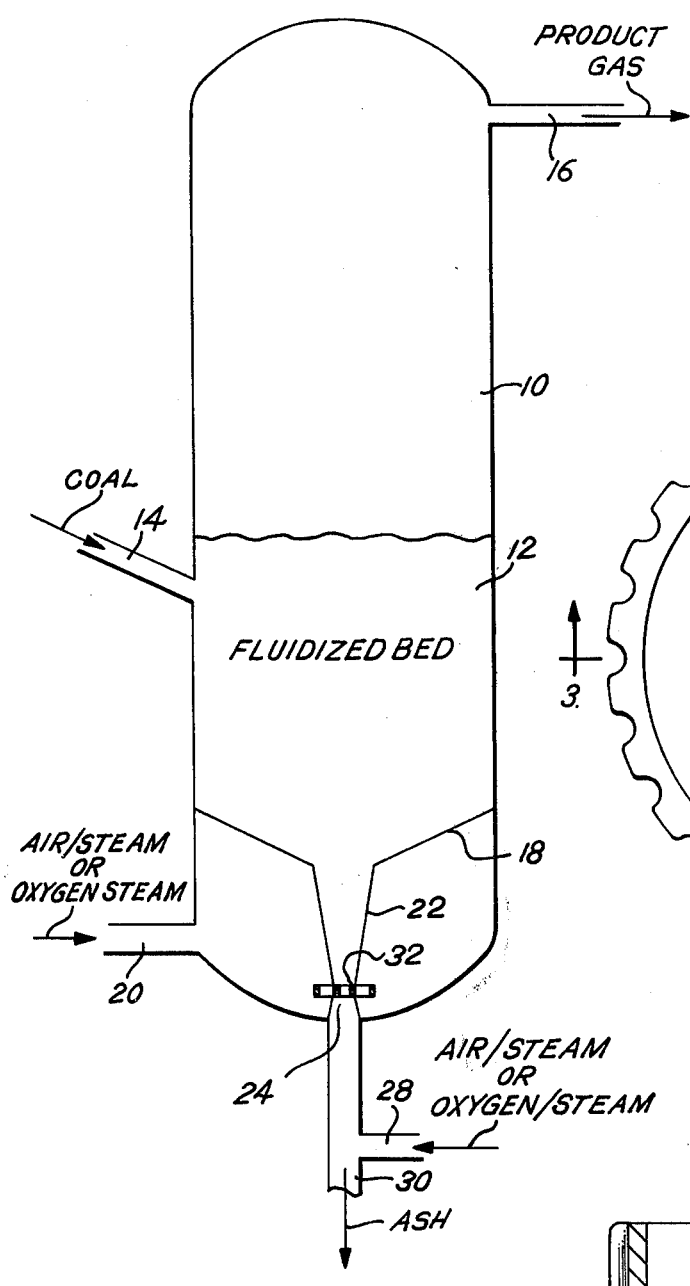
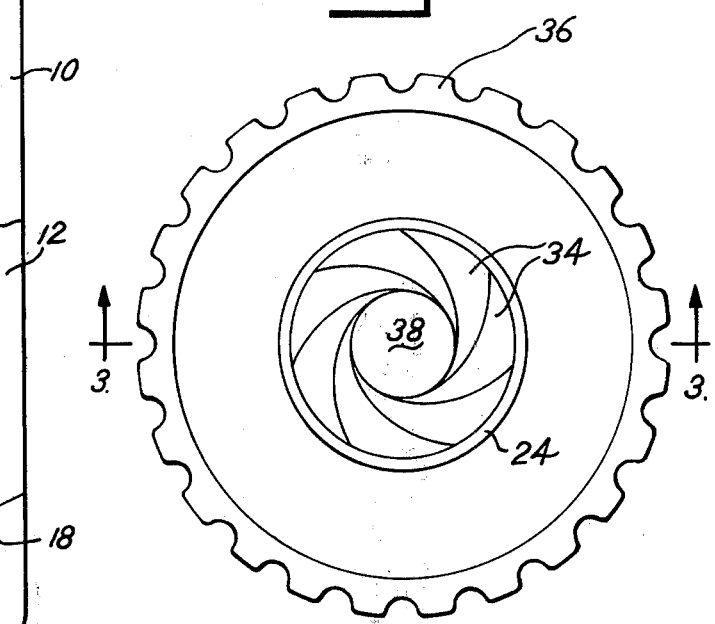
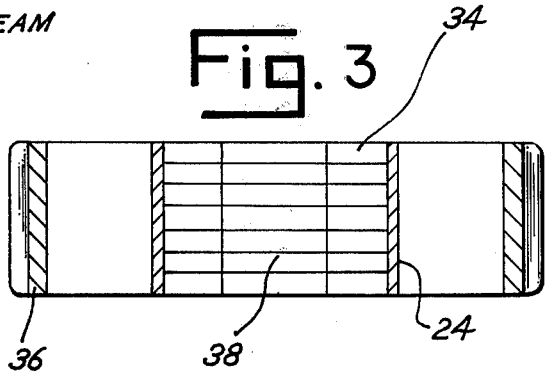

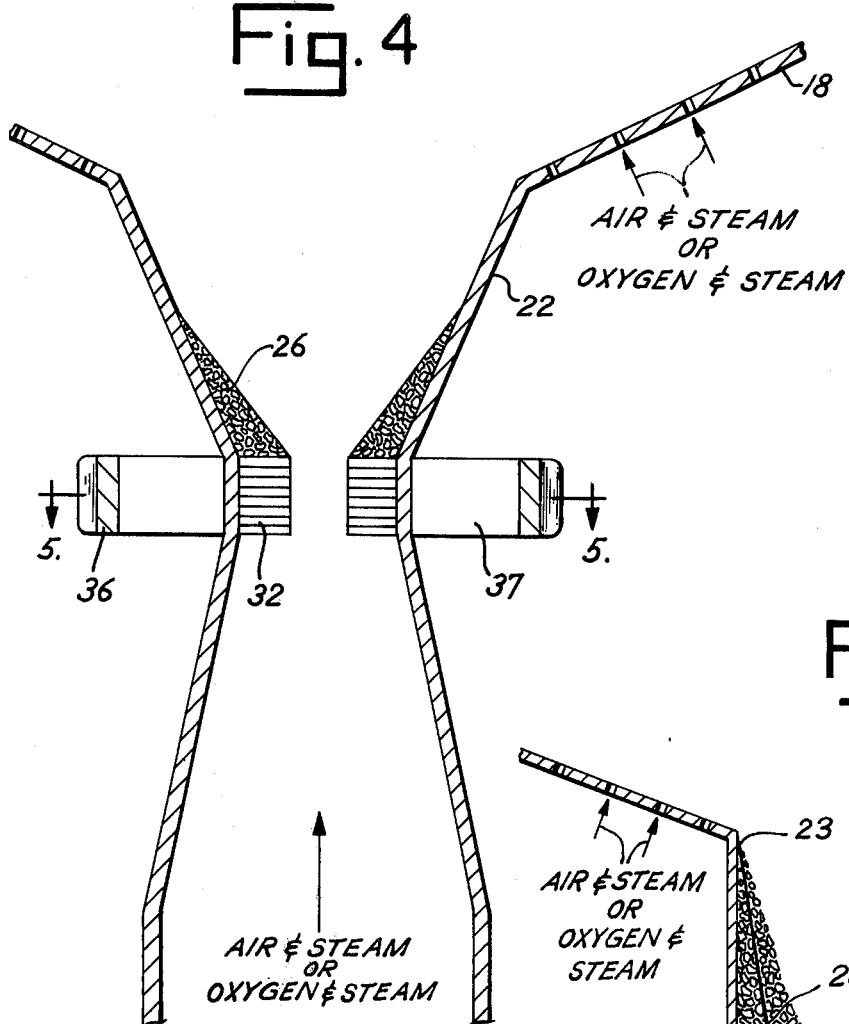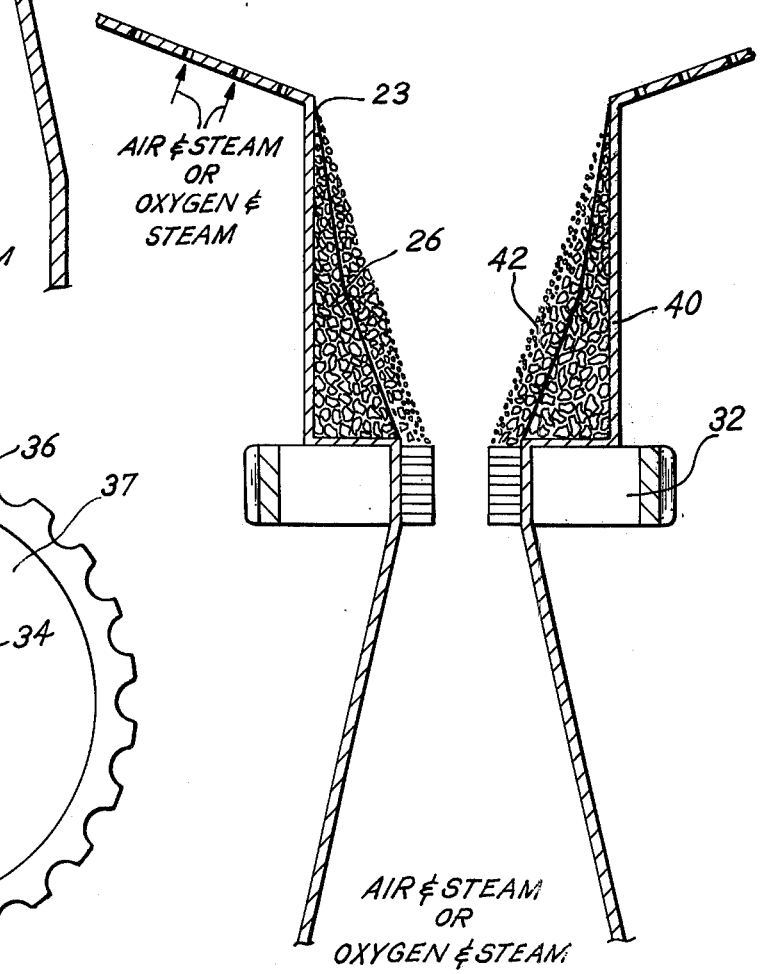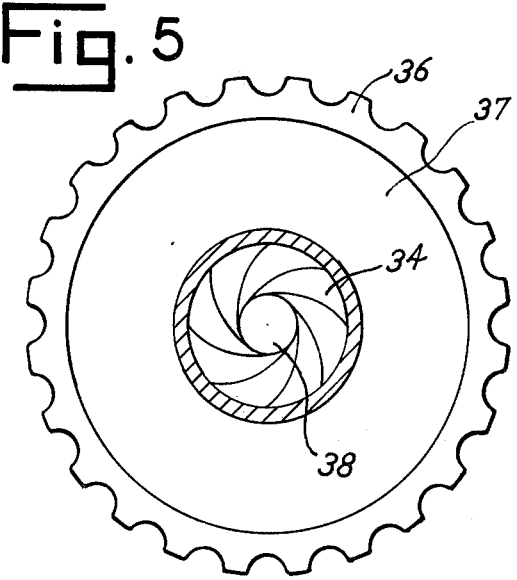

VALVE FOR ASH AGGLOMERATION DEVICE

BACKGROUND OF THE INVENTION

This invention relates to an improved apparatus for withdrawing agglomerated solids from a fluidizing chamber and more particularly to an apparatus of the nature described wherein agglomeration is effected by introduction of a high velocity gas stream at a controlled velocity into a fluidized bed.

A coal gasification reactor of the type wherein agglomerated coal ash is withdrawn from a fluid reaction bed of finely divided coal without the removal of the finely divided coal particles is disclosed in Jequier et al, U.S. Pat. No. 2,906,608 and Matthews et al, U.S. Pat. No. 3,935,825. These patents are incorporated herewith by reference. In a coal to gas conversion process of the type referenced, a vessel is provided for a fluidized bed. A gas distribution grid is usually positioned in the vessel and defines the bottom surface of the fluidized bed. The central portion of the grid may be conical or cylindrical in shape and comprises a passage. At the bottom of the passage, a constriction is provided having a fixed opening defining a venturi of fixed throat size to provide a uniform upward gas velocity into the vessel and thus into the fluidized bed. Directing a stream of high velocity gas through the venturi or passage into the reaction vessel causes ash particles in the vessel to agglomerate and eventually discharge through the passage and venturi throat.

For a venturi of a given throat size, the gas velocity into the vessel is fixed unless the quantity of gases entering the venturi is varied. The degree to which gas velocity may be varied is limited because of several restrictions on the distribution of total gases entering the gasifier through the distribution grid and the venturi. However, variation in gas velocity is desirable to control the size of ash agglomerates removed from the fluidized bed. Also, the required amount of fluidizing agents (steam and air or oxygen) may change depending upon small variations in the properties of the feed coal, changes in ambient conditions and changes in coal moisture content. Changes in ash characteristics of the coal may also alter agglomerating tendencies of the ash and therefor require different quantities of air and oxygen to adjust the temperature in the agglomerating zone within the vessel. For example, to avoid a discharge of fines along with ash agglomerate as a result of a higher load of fines in the feed batch or an increase in the fluidized bed height, the velocity at the venturi or passage to the vessel would necessarily be increased.

Additionally, a coal gasifier should have a variable gas output and a capability for turndown. Thus, during a turndown period the total gas throughput to the gasifier would decrease. To maintain ash agglomeration and high carbon utilization, the gas velocity through the venturi would necessarily be maintained at the high values required under normal operation.

In a venturi having a cross section of a constant value, the only means for maintaining a fixed gas velocity at the venturi throat is to change the relative distribution of gases entering the gasifier vessel through the distribution grid and the inlet passage including the venturi. Unfortunately, two requirements, (1) the minimum superficial gas velocity across the distribution grid to avoid sinter formation, and (2) the different quantity of oxygen in the gas stream to the grid and the input passage, place severe restrictions on the limits to which the rate of flow of gases to the grid and the venturi passage can be varied. It is with this background that the present invention was conceived.

SUMMARY OF THE INVENTION

In a principal aspect, the present invention relates to an apparatus and a method for varying the cross-sectional area of the venturi input to a fluidized bed retained within a vessel. In a preferred embodiment, an iris valve is positioned at the venturi throat to vary the area uniformly about the circumference of the venturi passage. In this manner, it is possible to retain a semi-fixed bed in the passage between the vessel and the throat of the venturi to facilitate agglomeration and flow of agglomerated solids from the vessel.

It is thus an object of the present invention to provide an improved apparatus and method for the agglomeration and collection of agglomerated solids from a fluidized bed.

A further object of the present invention is to provide a method and apparatus for controlling the input velocity of a high velocity gas stream into a fluidized bed by varying the size of the input throat opening to the bed.

Still another object of the present invention is to provide a velocity control mechanism for an agglomerating gas stream wherein the orifice through which the stream passes to the fluidized bed is uniformly altered in cross-sectional area about the circumference of the opening.

These and other objects, advantages and features of the invention will be set forth in the detailed description which follows.

BRIEF DESCRIPTION OF THE DRAWING

In the detailed description which follows, reference will be made to the drawing comprised of the following figures:

FIG. 1 is a schematic of a typical fluidized bed gasifier incorporating an ash agglomerating device;

FIG. 2 is a top plan view of the improved venturi control valve for the gasifier of FIG. 1;

FIG. 3 is a cross-sectional view of the valve construction shown in FIG. 2 taken along the line 3—3;

FIG. 4 is an enlarged cross-sectional view of the improved apparatus of the present invention incorporated with an inverted cone shaped gas inlet passage;

FIG. 5 is a cross-sectional view of the valve illustrated in FIG. 4 taken along the line 5—5; and FIG. 6 is a cross-sectional view of the improved apparatus of the present invention incorporated with a cylindrical shaped gas inlet passage.

DESCRIPTION OF THE PREFERRED EMBODIMENT

FIG. 1 is a schematic drawing of a fluidized bed gasifying apparatus or device which includes means for agglomerating ash or particulate in the fluidized bed. Such a device has been described in Jequier et al U.S. Pat. No. 2,906,608 and Matthews et al U.S. Pat. No. 3,935,825, both previously referenced. Briefly, the device includes a vessel 10 within which a fluidized bed 12 is retained. Pulverized fresh feed coal enters via line 14 and is contained within the bottom portion of the vessel or reactor 10 as a fluid bed 12 having a bed density of about 15 to 30 pounds per cubic foot. The coal within the bed 10 is converted by reaction with steam and air to gaseous fuel components. These gaseous fuel components pass from the vessel 10 through a discharge line 16.

A shaped sloped grid 18 is provided within the vessel 10 at the bottom of the bed 12. Air and steam enter through a line 20 and pass through openings in the grid 18 to assist in maintence of the bed 12 in a fluidized state. The ash contained in the feed coal within the bed 12 generally settles near the bottom of the fluid bed 12 due to its greater density. Thus, the ash particles flow down the sides of the generally conical grid 18 and pass into or enter a withdrawal chamber or passage 22 which is formed as part of the grid 18.

The ash particles are contacted within passage 22 by a high velocity air-steam stream having a velocity in the range of 50 to 200 feet per second. The stream enters the chamber or passage 22 by passing from line 28 and through the narrow throat or orifice 24 of the passage or venturi tube 22. The ash particles may be admixed with a considerable amount of finely divided coal particles and form a semi-fixed bed 26 in the passage 22 as shown in FIGS. 4 and 6. This semi-fixed bed 26 has a density generally in the range of 40 to 60 pounds per cubic foot.

The semi-fixed bed 26 within the passage 22 protects the sides of the passage 22 from abrasive effects created by the high velocity stream through the throat or orifice 24 and additionally protects the walls of the vessel from localized high temperatures. Also, the air-steam stream entering the throat 24 via an inlet line 28 reacts with coal particles that enter the region of the passage 22 resulting in temperatures of 100 to 200° F. higher than the temperature maintained in the fluid bed 12.

The air-steam stream represented by input through passage 22 constitutes approximately 20–40% of the total air and steam to the bed 12. The remainder enters by way of line 20 and grid 18. Typically, the fluid bed has a temperature of 1800°–2000° F. and the temperature in the region of the passage is about 2000°–2200° F.

The localized higher temperatures in the region of passage 22 cause the ash particles within the passage 22 to become sticky. As a consequence, the ash particles as they strike each other gradually agglomerate. When they reach a sufficient size and weight, the velocity of air-steam stream entering through the venturi orifice 24 is insufficient to keep the agglomerated particles in a fluid or suspended state. They pass downwardly through the orifice 24 into withdrawal line 30.

The velocity of the inlet gases through the venturi throat 24 is high compared to the gas velocity at distribution grid 18. This high velocity stream, as mentioned previously, forms a jet or a spout giving rise to a violent and rapid circulation of solids in the zone of the passage 22. The gases passing through the orifice 24 also contain a higher percentage of the oxident than those gases passing through the distribution grid 18. Thereby, as previously explained, a higher temperature is generated in the zone of the passage 22 and in the middle, but not entirely through the fluidized bed 12.

As previously explained, the gas velocity may necessarily require variance through the venturi throat 24 for any of a number of reasons. In order to accomplish this required change in velocity, an iris-diaphragm valve 32 is provided at the venturi throat or orifice 24. This valve 32 is shown in combination with two different types of shaped passages or venturi 22. In FIG. 4, the valve 32 is shown in combination with an inverted type conical passage 22. In FIG. 6, the valve 32 is shown in combination with a cylindrical passage 23 or tube of the nature shown in the Matthews et al patent. Of course, the valve 32 can be used in combination with other types of ash agglomerating and withdrawal devices and can be used in combination with any apparatus wherein solids are withdrawn counter to a stream of flowing gases.

As illustrated in FIGS. 2–6, the valve 32 consists of a plurality of metal leaves 34 which overlay one another to form a circular aperture 38. The leaves 34 can be rotated by means of an external control ring 36 to vary the size of the orifice 24 and thus adjust the cross-sectional area or diameter of the circular aperture 38. When valve 32 is completely open, all of the leaves 34 are retracted into a valve body 37 and the venturi throat 24 has its largest possible diameter and cross-sectional area.

During operation dust may accumulate between the valve leaves 34 and hinder their movement. Since air and steam are directed at the leaves, however, the dust may not provide a hindrance to their operation. It is also possible to spray the leaves 34 at fixed time intervals with dry lubricant to keep them mobile. FIG. 4 illustrates an agglomerating passage 22 of the type shown in the Jequier et al patent. The passage 22 has a length which is greater than or equal to its diameter. The diameter at throat 24 is controlled by ring 36. Ash agglomerates are formed in the conical region above the valve 32. When the valve 32 is fully opened, the conical portion of the passage or venturi tube 22 continues and merges smoothly into the venturi throat 24 or valve 32, thus permitting ash which has been agglomerated to fall through the throat 24 for ultimate discharge.

When the valve 32 is partially closed, however, as illustrated in FIG. 4, the leaves 34 project partially into the aperture or opening 38 defining the venturi throat 24. This distorts the smooth contour of the upper portion of the passage 22. Gas flow through such a distorted aperture would normally cause turbulance and high pressure drop. However, as the valve 32 opens, agglomerated coal particles flow down the inner conical surface of the venturi tube 22 and form a new smooth surface as shown in FIG. 4. Thus, a conical shaped surface is formed by the agglomerated ash forming a semi-fixed bed. Normally, the throat diameter of apparatus or valve 32 of the type shown in FIG. 4 could be varied between six inches and one inch with the gas velocity consequently varying in the range of 15 to 550 feet per second.

FIG. 6 illustrates an alternative embodiment wherein the passage 23 is cylindrical in shape as disclosed by the Mathews et al patent. In such an instance, agglomeration of the ash normally forms a semi-fixed bed 40 in the shape of an inverted cone when the valve 32 is in its full open position. Upon partial closure of the valve 32, agglomerated material forms the inverted cone shaped bed 42 in FIG. 6. Again, the formation of the agglomerated ash bed 42 will prevent disturbing turblance in the passage.

The use of the valve 32 is illustrated by the following examples. With a venturi throat diameter of 3 inches and a gas velocity at the throat of approximately 80 feet per second wherein discharge is effected for one-half inch diameter agglomerates, a fresh batch of coal feed enters with an excess of fines. The fines would normally begin to discharge with the ash agglomerate. An increase in the gas velocity to about 115 feet per second by reducing the venturi throat diameter to 2 and one-half inches will substantially eliminate the downward flow of fines. Without a valve, the rate of flow of gases through the venturi would necessarily need to be increased by about 44%. This would result in an unacceptable and corresponding decrease in the flow of gases through the sloped grid 18.

As another example, if the characteristic of the ash and the coal feed were changed so that the ash softening point was raised by about 150° F., a higher ratio of oxidant into the gases entering the venturi would be required. With a valve of the type disclosed herein, the quantity of oxidant into the venturi can be increased without increasing the gas velocity at the throat. This is accomplished by increasing the diameter of the venturi throat as the oxidant flow rate into it increases so as to maintain a constant velocity.

For operation at lower throughputs of the gasifier, the total gas flow rate into the unit may be increased as much as 50–70% of the normal gas flow rate. Without a variable venturi throat, the ash agglomerating device would be inoperable. By reducing the venturi throat diameter, it is possible to maintain high venturi throat gas velocity even at low gas flow rates.

Ordinary valves such as a butterfly valve or a slide valve or a gate valve would not be deemed acceptable for use in an ash agglomerating device to control gas velocity while simultaneously permitting spherical ash agglomerates to flow down without restriction. Use of such other valves would upset the flow pattern around the upward movement of gas in the venturi tube and would create turbulance with hinders the formation of the agglomerates in the fixed bed or formed conical portion above the venturi throat or orifice. With the present invention, it is possible to maintain the fixed bed conical formation of agglomerated ash above the throat. This conical formation is formed in direct response to orifice size of the valve 32. Therefore, while in the foregoing there has been set forth a preferred embodiment of the invention, it is to be understood that the invention shall be limited only by the following claims and their equivalents.

What is claimed is:

1. A process for withdrawing agglomerated solids from a fluidized bed of finely divided solids comprising the steps of:
   a. introducing a high velocity gas stream into a vessel containing a bed of fluidized solids through at least one withdrawal passage, said passage being open at the top and having a constricted portion at the bottom to receive a high velocity gas stream;
   b. permitting some solids to flow from the fluid bed into said passage around the perimeter thereof;
   c. maintaining said solids in the passage as a semi-fixed bed defining, at least in part, the walls of the passage; and
   d. adjusting the cross-sectional area of the constricted portion to thereby form the semi-fixed bed as an inverted cone in said passage, the walls of said cone being the walls of the semi-fixed bed, and also to thereby adjust the velocity of the gas stream thereby permitting the selective removal of agglomerated solids from said bed without removal of finely divided solids therefrom and further permitting efficient reaction of the stream with particles in said bed of fluidized solids.

2. In an apparatus for withdrawing agglomerated solids from a fluidized bed of finely divided solids, said apparatus including a vessel for the bed and a withdrawal passage connected to the bottom of the vessel, said passage having a constricted opening, said constricted opening defining a means for directing a quantity of gas into the vessel in a uniform upward velocity and facilitating a flow of agglomerated solids from the vessel, the improvement which comprises an iris valve means in the passage for controlling the velocity of the gas flowing into the vessel during a constant quantity flow of gas into the vessel, for maintaining a uniform upward velocity of gas through the constricted opening, for also controlling the size of agglomerated solids withdrawn from the vessel.

3. In an apparatus for withdrawing agglomerated solids from a fluidized bed of finely divided solids, said apparatus including a vessel for the bed and a withdrawal passage connected to the bottom of the vessel, said passage having a constricted opening, said constricted opening defining a means for directing a quantity of gas into the vessel in a uniform upward velocity and facilitating a flow of agglomerated solids from the vessel, the improvement which comprises a valve means for varying the cross-sectional area of said constricted opening while simultaneously maintaining the same quantity flow of gas into the vessel, whereby uniform upward velocity of gas flowing into the vessel is maintained and the size of agglomerated particles flowing from the vessel may be adjusted.

4. The improved apparatus of claim 3 wherein said means for varying the cross-sectional area of said constricted opening includes valve means for altering the cross-sectional area substantially uniformly about the circumference thereof.

5. The improved apparatus of claim 3 wherein said passage comprises a venturi tube, said constricted opening comprises the throat of the venturi tube, and the improvement comprises a means to vary the cross-sectional area of the throat of the venturi tube while maintaining the uniform upward velocity of gas entering the vessel.

6. The improved apparatus of claim 3 wherein said means for varying the cross-sectional area of the constricted opening comprises an iris valve.

7. The improved apparatus of claim 3 wherein said passage includes a cylindrical portion having a diameter greater than the diameter of said constricted opening, said cylindrical portion being upstream from said constricted opening relative to the flow of gas whereby agglomerated solids form an inverted conical semi-fixed bed between the vessel and the constricted opening which alters in shape to accomodate adjustments in the size of the constricted opening and which promotes a smooth, uniform upward flow of gas passing through the constricted opening into the vessel.

* * * * *